United States Patent
Iyengar et al.

(10) Patent No.: US 10,778,463 B2
(45) Date of Patent: Sep. 15, 2020

(54) DISPLAYING INFORMATION FOR A SMART-DEVICE-ENABLED ENVIRONMENT

(71) Applicant: HARMAN INTERNATIONAL INDUSTRIES, INC., Stamford, CT (US)

(72) Inventors: Vaijayanthi Iyengar, Plano, TX (US); Adam Gershon, Rockwall, TX (US); Dylan Brooks Carroll, Dallas, TX (US)

(73) Assignee: Harman International Industries, Incorporated, Stamford, CT (US)

( * ) Notice: Subject to any disclaimer, the term of this patent is extended or adjusted under 35 U.S.C. 154(b) by 598 days.

(21) Appl. No.: 15/608,937

(22) Filed: May 30, 2017

(65) Prior Publication Data
US 2018/0351762 A1    Dec. 6, 2018

(51) Int. Cl.
*G06F 15/173* (2006.01)
*H04L 12/28* (2006.01)
*G05B 15/02* (2006.01)
*G06F 3/0481* (2013.01)
*G06F 3/0488* (2013.01)

(52) U.S. Cl.
CPC .......... *H04L 12/2827* (2013.01); *G05B 15/02* (2013.01); *G05B 2219/2642* (2013.01); *G06F 3/0488* (2013.01); *G06F 3/04817* (2013.01)

(58) Field of Classification Search
CPC ............ H04L 12/2827; H04L 65/4048; H04L 65/608; H04L 65/80; H04L 21/6125; H04L 21/4622; G05B 15/02
See application file for complete search history.

(56) References Cited

U.S. PATENT DOCUMENTS

| | | | |
|---|---|---|---|
| 9,911,290 B1* | 3/2018 | Zalewski | G07G 1/0072 |
| 2009/0316671 A1* | 12/2009 | Rolf | H04W 4/029 370/338 |
| 2014/0139637 A1* | 5/2014 | Mistry | G06F 1/163 348/46 |
| 2015/0109104 A1* | 4/2015 | Fadell | G08B 27/003 340/5.65 |
| 2015/0109112 A1* | 4/2015 | Fadell | G08B 27/003 340/328 |
| 2015/0109128 A1* | 4/2015 | Fadell | G08B 27/003 340/540 |

(Continued)

*Primary Examiner* — Thanh T Nguyen
(74) *Attorney, Agent, or Firm* — Artegis Law Group, LLP

(57) ABSTRACT

A method for displaying information associated with a smart-device-enabled environment includes receiving an activation signal; in response to receiving the activation signal, selecting as a primary space in the environment a first physical space that includes at least one apparatus that is controllable by a networked computing device; selecting as a secondary space in the environment a second physical space that includes at least one apparatus that is controllable by a networked computing device; causing information associated with the at least one apparatus included in the first physical space to be displayed with a first visual prominence on a display device; and causing information associated with the at least one apparatus included in the second physical space to be displayed with a second visual prominence on the display device, wherein the first visual prominence is greater than the second visual prominence.

20 Claims, 7 Drawing Sheets

(56) References Cited

U.S. PATENT DOCUMENTS

| | | | | |
|---|---|---|---|---|
| 2015/0112885 A1* | 4/2015 | Fadell | .................... | G08B 27/00 |
| | | | | 705/330 |
| 2015/0116106 A1* | 4/2015 | Fadell | ................. | G08B 19/005 |
| | | | | 340/501 |
| 2015/0116107 A1* | 4/2015 | Fadell | ................. | G08B 19/005 |
| | | | | 340/501 |
| 2015/0116108 A1* | 4/2015 | Fadell | ................. | G08B 19/005 |
| | | | | 340/501 |
| 2015/0116109 A1* | 4/2015 | Fadell | ................. | G08B 19/005 |
| | | | | 340/501 |
| 2015/0330805 A1* | 11/2015 | Cho | ................... | G01C 21/3676 |
| | | | | 701/428 |
| 2015/0332031 A1* | 11/2015 | Mistry | .................... | H04W 4/80 |
| | | | | 726/19 |
| 2017/0068322 A1* | 3/2017 | Steinberg | ................ | G06F 3/005 |
| 2018/0292907 A1* | 10/2018 | Katz | ................... | G06F 3/04842 |
| 2019/0080665 A1* | 3/2019 | Jeong | .................... | G06F 1/1601 |
| 2019/0179205 A1* | 6/2019 | Shi | ....................... | G02B 5/3083 |
| 2019/0295118 A1* | 9/2019 | Martin | .............. | G06Q 30/0239 |

\* cited by examiner

DISPLAYING INFORMATION FOR A SMART-DEVICE-ENABLED ENVIRONMENT

BACKGROUND

Field of the Claimed Embodiments

Embodiments of the present invention relate generally to network-connected electronic devices, and, more specifically, to displaying information for a smart-device-enabled environment.

Description of the Related Art

Systems are now available for businesses and individual consumers that include various networked and centrally-controlled electronic devices, sometimes referred to as "smart" devices. For example, a "smart" home environment may include wirelessly networked and remotely controlled speakers, display screens, lights, window shades, and the like, each of which being controlled by a central computing device, such as a wireless hub, a desktop computer, or an electronic tablet.

Because smartphones are now ubiquitous, software applications have been developed to enable a user to control, check status of, and otherwise interact with smart devices in such a smart home environment. As a result, a user is not restricted to interacting with smart devices in the smart home environment via a single, centrally located computing device. Instead, with a suitable software application running on a smartphone, wearable device, or other mobile computing device, the user can interact with smart devices throughout the smart home environment from any physical space or room within the smart home environment.

However, as the prevalence of smart devices in home and business environments increases, the ability to efficiently control and interact with such devices via a conventional user interface (UI) is becoming more difficult. For example, when a user operates or checks the status of a specific smart device in a particular room, conventional UIs often present a large amount of visual information that is not related to that specific smart device or to that particular room. Displaying a large amount of information can place a large cognitive load on the user. For example, in order for a user to complete a particular task, the user may be required to sort through large amounts of unrelated visual information, even when the task is relatively simple. For instance, if a user wants to turn off a light in a particular room via the UI, the user typically must either navigate through a large number of room displays included in the UI to find the particular room, or locate that particular room in a drop-down list or other menu of rooms presented by the UI. As a result, performing even a relatively simple task requires significant time and concentration to complete via a conventional UI.

Accordingly, improved techniques for displaying information associated with a smart-device-enabled environment would be useful.

SUMMARY

The various embodiments set forth a non-transitory computer-readable medium including instructions that, when executed by one or more processors, configure the one or more processors to perform by performing the steps of receiving an activation signal; in response to receiving the activation signal, selecting as a primary space in the environment a first physical space that includes at least one apparatus that is controllable by a networked computing device; selecting as a secondary space in the environment a second physical space that includes at least one apparatus that is controllable by a networked computing device; causing information associated with the at least one apparatus included in the first physical space to be displayed with a first visual prominence on a display device; and causing information associated with the at least one apparatus included in the second physical space to be displayed with a second visual prominence on the display device, wherein the first visual prominence is greater than the second visual prominence.

At least one advantage of the disclosed embodiments is that a user can quickly and efficiently locate and interact with a smart device in a smart-device-enabled environment via a user interface, when the smart-device-enabled environment includes a large number of rooms or other physical spaces. A further advantage is that the user interface presents contextually relevant information and interface elements based on user preferences, interaction history, and/or location within the environment, as well as on currently active services and smart devices.

BRIEF DESCRIPTION OF THE SEVERAL VIEWS OF THE DRAWINGS

So that the manner in which the above recited features of the various embodiments can be understood in detail, a more particular description of the various embodiments, briefly summarized above, may be had by reference to embodiments, some of which are illustrated in the appended drawings. It is to be noted, however, that the appended drawings illustrate only typical embodiments and are therefore not to be considered limiting of its scope, for the various embodiments may admit to other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

Figure 1:
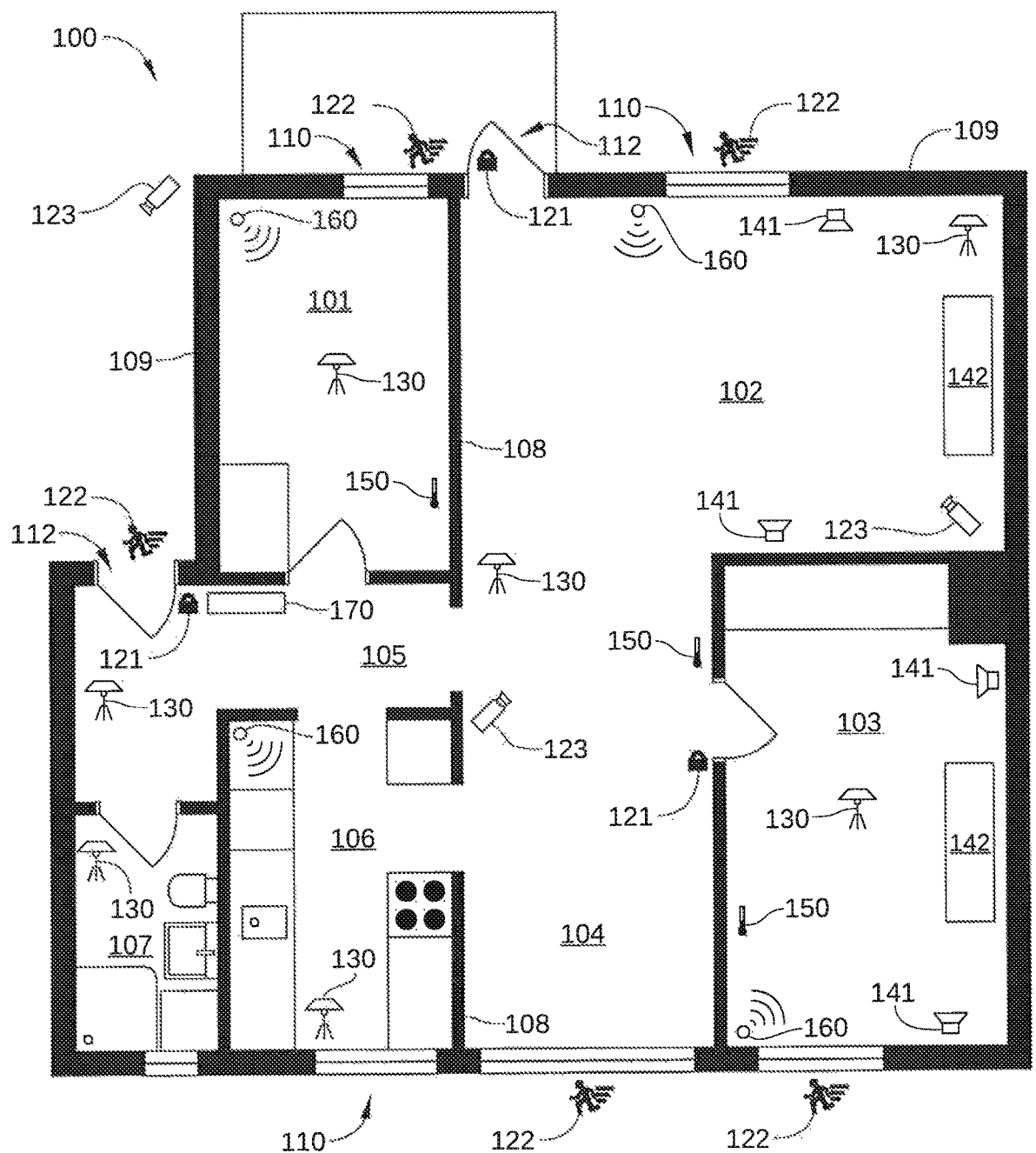
FIG. 1 is a schematic diagram illustrating a smart-device-enabled environment, configured to implement one or more aspects of the various embodiments of the present disclosure.

FIG. 1 is a schematic diagram illustrating a smart-device-enabled environment 100, configured to implement one or more aspects of the present disclosure. Smart-device-enabled environment 100 may be any physical space or structure that includes at least one apparatus that is controllable by a network-connected computing device or controller. Such apparatuses are referred to herein as "smart devices" and may include a wide variety of user-controlled and/or user-programmable devices. Examples of smart devices include home automation appliances, home security hardware, lights coupled to individual network-connected controllers, and smart speakers enabled with an intelligent personal assistant (IPA), such as Microsoft Cortana™, Apple Siri™, and Amazon Alexa™, as described in greater detail below.

The physical space or structure that corresponds to smart-device-enabled environment 100 may include a plurality of rooms and/or floors, such as a home, office, or commercial building. In some embodiments, smart-device-enabled environment 100 may also include separate buildings, such as a business or educational campus. In the embodiment illustrated in FIG. 1, smart-device-enabled environment 100 is a multi-room living space, such as a house or apartment, and includes rooms 101-107, interior walls 108, exterior walls 109, windows 110 and doors 112. Disposed within rooms 101-107 or proximate windows 110 or doors 112 are various automated locks 121, motion sensors 122, and/or cameras 123 (collectively referred to herein as security devices 120) that can be controlled via a central controller 170 or a suitably programmed mobile computing device (not shown). Also disposed within rooms 101-107 are various smart lights 130, smart speakers 141, network-controlled video display devices 142 (such as a display screen coupled to an audio-video receiver or digital video recorder), thermostats (or other environmental controls) 150, and locater beacons 160. Each of the above smart devices is also controllable via central controller 170 or a suitably programmed mobile computing device, as described below.

Security devices 120 may be communicatively connected to central controller 170 directly via a wired and/or wireless connection, via the Internet, as described below in conjunction with FIG. 3, or via a security system controller (not shown). Smart lights 130, smart speakers 141, video display devices 142, and thermostats 150 may be communicatively connected to central controller 170 via a wired connection or via any technically feasible wireless connection, such as WiFi, Bluetooth®, and the like.

Smart lights 130 typically include a control switch that is configured to turn on one or more light fixtures in response to a suitable control signal from central controller 170 and to transmit a status signal to central controller 170, i.e., an on/off signal. In some embodiments, smart lights 130 are incorporated into a home automation system that is controllable by central controller 170.

Smart speakers 141 are typically configured to be controllable by central controller 170 via a Bluetooth® or other wireless connection, including on/off, mute/unmute, and volume control. In addition, smart speakers 141 typically receive audio data from central controller 170 and/or from other smart devices in smart-device-enabled environment 100, such as from an audio-video receiver, digital video recorder, or wireless router. In some embodiments, one or more of smart speakers 141 are further configured to provide a feed-back signal or other status information to central controller 170, such as on/off status, mute/unmute status, sound volume, "now playing" information, and the like. In some embodiments, one or more of smart speakers 141 are IPA-enabled devices. Examples of video display devices 142 include a computer monitor, a smart TV, or any other digital display device that is configured to receive a video signal from central controller 170 and/or from another smart device, such as a suitably configured audio-video receiver, digital video recorder, or wireless router. In some embodiments, one or more of video display devices 142 are further configured to provide a feed-back signal or other status information to central controller 170, such as on/off status, "now playing" information, and the like.

Thermostats 150 are configured to enable control of environmental conditions in one or more of rooms 101-107. As such, thermostats 150 typically include one or more sensors (e.g., temperature and humidity sensors) that provide feedback information to central controller 170 describing current conditions in one or more of rooms 101-107. Furthermore, in some embodiments, thermostats 150 are configured to control environment control systems associated with smart-device-enabled environment 100 (e.g., heaters and/or air-conditioning units). In such embodiments, thermostats 150 may be incorporated into a home automation system (not shown) that can be controlled via central controller 170, and may be communicatively connected to central controller 170 via the home automation system. Thus, in such embodiments, central controller 170 receives feedback information from thermostats 150 via the home automation system and sends control signals to thermostats 150 via the home automation system. Alternatively, central controller 170 can receive feedback information directly from thermostats 150 and can send control signals directly to thermostats 150 in lieu of a home automation system.

Locater beacons 160 are wireless devices configured to enable central controller 170 to determine the location of a particular user in smart-device-enabled environment 100, and are communicatively coupled to central controller 170 via a wireless connection, such as a personal area network (PAN) based on a Bluetooth® low-energy (BLE) communication protocol.

Central controller 170 is configured to provide an interface between the various smart devices included in smart-device-enabled environment 100 and a user. In some embodiments, central controller 170 is implemented as a home automation hub. As such, central controller 170 may include a dedicated display screen or touch-sensitive panel to provide a user interface to a user, wired connections to one or more of the smart devices included in smart-device-enabled environment 100, and/or a wireless router or any other technically feasible device configured to relay wireless commands to one or more smart devices included in smart-device-enabled environment 100. Alternatively, the functionality of central controller 170 can be incorporated into a mobile computing device, such as a suitably programmed smartphone, electronic tablet, smart watch or other wearable, and the like. In either case, central controller 170 is implemented as a computing device. One embodiment of such a computing device is described below in conjunction with FIG. 2.

Figure 2:
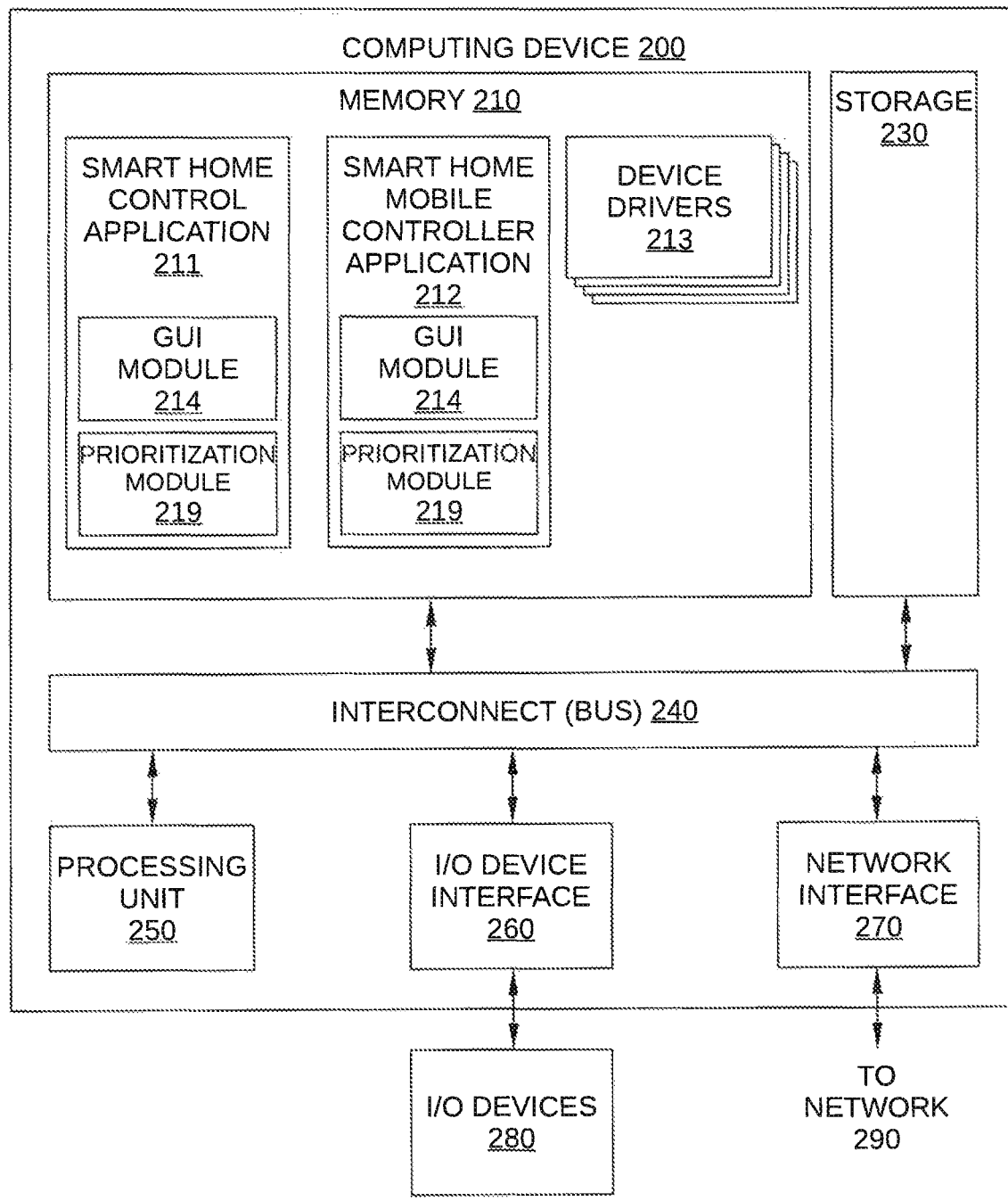
FIG. 2 illustrates a computing device configured to implement one or more aspects of the present disclosure.

FIG. 2 illustrates a computing device 200 configured to implement one or more aspects of the present disclosure. Computing device 200 may be employed as central controller 170, and/or as a mobile computing device employed by a user to interact with some or all of the smart devices included in smart-device-enabled environment 100. As such, computing device 200 is configured to execute one or more of a smart home control application 211 and/or a smart home mobile controller application 212, each of which may reside in a memory 210. In addition, in some embodiments, memory 210 includes one or more device drivers 213 that are each configured to enable communication between computing device 200 and at least one of the smart devices included in smart-device-enabled environment 100. In some embodiments, one or more of smart home control application 211 and/or smart home mobile controller application 212 may include a graphical user interface (GUI) module 214, which is configured to display information associated with smart-device-enabled environment 100 according to various embodiments of the present disclosure. In some embodiments, home control application 211 and/or smart home mobile controller application 212 is configured with a room prioritization module 219. It is noted that the computing device described herein is illustrative and that any other technically feasible configurations fall within the scope of the present invention.

As shown, computing device 200 includes, without limitation, an interconnect (bus) 240 that connects a processing unit 250, an input/output (I/O) device interface 260 coupled to input/output (I/O) devices 280, memory 210, a storage 230, and a network interface 270. Processing unit 250 may be any suitable processor implemented as a central processing unit (CPU), an application-specific integrated circuit (ASIC), a field programmable gate array (FPGA), any other type of processing unit, or a combination of different processing units. In general, processing unit 250 may be any technically feasible hardware unit capable of processing data and/or executing software applications, including smart home control application 211 and/or smart home mobile controller application 212. Further, in the context of this disclosure, the computing elements shown in computing device 200 may correspond to a physical computing system (e.g., a system in a data center) or may be a virtual computing instance executing within a computing cloud.

I/O devices 280 may include devices capable of providing input, such as a keyboard, a mouse, a touch-sensitive screen, a microphone and so forth, as well as devices capable of providing output, such as a loudspeaker and a display screen. The display screen may be a computer monitor, a video display screen, a display apparatus incorporated into a hand held device, or any other technically feasible display screen.

I/O devices 280 may include additional devices capable of both receiving input and providing output, such as a wall-mounted or hand-held touchscreen, a universal serial bus (USB) port, and so forth. Such I/O devices 280 may be configured to receive various types of input from an end-user of computing device 200, and also to provide various types of output to the end-user of computing device 200, such as displayed digital images or digital videos. In some embodiments, one or more of I/O devices 280 are configured to communicatively couple computing device 200 to a communications network 290. Alternatively, computing device 200 is communicatively coupled to communications network 290 via network interface 270 (described below).

Communication network 290 may be any technically feasible type of communications network that allows data to be exchanged between central controller 170 and the smart devices included in smart-device-enabled environment 100 and other entities or devices, such as a web server or another networked computing device. For example, communication network 290 may include a wide area network (WAN), a local area network (LAN), a wireless (e.g., WiFi) network, wireless personal area network (WPAN) (such as a Bluetooth network), a Digital Living Network Alliance (DLNA) enabled network, and/or the Internet, among others. Thus, in some embodiments, some or all of the smart devices in smart-device-enabled environment 100 are communicatively coupled to computing device 200 via wired connections, and in some embodiments, some or all of the smart devices in smart-device-enabled environment 100 are communicatively coupled to computing device 200 via one or more wireless connections, e.g., WiFi or Bluetooth®.

I/O interface 260 enables communication of I/O devices 280 with processing unit 250. I/O interface generally includes the requisite logic for interpreting addresses corresponding to I/O devices 280 that are generated by processing unit 250. I/O interface 260 may also be configured to implement a handshaking process between processing unit 250 and I/O devices 280 and/or generate interrupts associated with I/O devices 280. I/O interface 260 may be implemented as any technically feasible CPU, ASIC, FPGA, or any other type of processing unit or device.

Network interface 270 is a computer hardware component that connects processing unit 250 to communication network 290. Network interface 270 may be implemented in computing device 200 as a stand-alone card, processor, or other hardware device. In embodiments in which communication network 290 includes a wireless network or a WPAN, network interface 270 includes a suitable wireless transceiver. Alternatively or additionally, network interface 270 may be configured with cellular communication capability, satellite telephone communication capability, a DLNA communication capability, a wireless WAN communication capability, or other types of communication capabilities that allow for communication with communication network 290 and with other computing devices 200 included in smart-device-enabled environment 100.

Memory 210 may include a random access memory (RAM) module, a flash memory unit, or any other type of memory unit or combination thereof. Processing unit 250, I/O device interface 260, and network interface 270 are configured to read data from and write data to memory 210. Memory 210 includes various software programs that can be executed by processor 250 and application data associated with said software programs, including smart home control application 211 and/or smart home mobile controller application 212.

Home control application 211 is configured to enable operation of computing device 200 as a central hub or "gateway" that provides a GUI or other user interface and enables interactions with the various smart devices of smart-device-enabled environment 100. Interactions include controlling the various smart devices in smart-device-enabled environment 100 and receiving feedback information therefrom, such as status information, anomaly alerts, etc.

Smart home mobile controller application 212 is configured to enable a mobile computing device, such as a smartphone or a wearable computing device, to interact with the various smart devices of smart-device-enabled environment 100. In some embodiments, smart home mobile controller application 212 implements the full functionality of central controller 170 into such a mobile computing device. Thus, in such embodiments, a user can, via a mobile computing device, perform the control functions and settings changes associated with central controller 170, and interrogate each of the various smart devices of smart-device-enabled environment 100. The mobile computing device can be employed in lieu of or in addition to central controller 170. In other embodiments, smart home mobile controller application 212 is configured to enable a mobile computing device to communicate with central controller 170. In such embodiments, central controller 170 provides the information displayed by the mobile computing device.

According to various embodiments of the disclosure, home control application 211 and/or smart home mobile controller application 212 is configured with room prioritization module 219. Room prioritization module 219 includes algorithms for determining a priority of rooms 101-107, such as by ranking rooms 101-107 in order of priority. For example, rooms 101-107 may be each ranked, based on one or more criteria, as a primary space, a secondary space, or a tertiary space, etc. of smart-device-enabled environment 100. As a result, information associated with the highest priority room or rooms in smart-device-based environment 100, i.e., the primary space or spaces, can be selected to be displayed with more visual prominence and/or in greater detail than lower priority rooms in smart-device-based environment 100, i.e., the secondary and tertiary spaces.

In some embodiments, the priority of each of rooms 101-107 is based on a proximity of that room to the user. In such embodiments, central controller 170 can determine the location of the user based on location data for a mobile or wearable computing device that are received from locater beacons 160. Alternatively, in situations in which the user is interacting directly with central controller 170, rather than via a mobile computing device, central controller 170 can assume the location of the user is coincident with central controller 170. Thus, central controller 170 determines the priority of each of rooms 101-107 based on a distance between the room in which the user (or a display device associated with the user) is located and the room being prioritized, where less distance corresponds to higher priority. Alternatively or additionally, central controller 170 can determine the location of the user based on GPS data received from a mobile computing device associated with the user, or any other technically feasible technique, such as via motion sensors 122 and/or cameras 123.

In some embodiments, once central controller 170 has determined in which specific room the user is located in smart-device-enabled environment 100, central controller 170 can determine a priority of each of the other rooms in smart-device-enabled environment 100. For example and without limitation, central controller 170 may determine such room priorities based on a topological representation of smart-device-enabled environment 100. Upon set-up of central controller 170 in smart-device-enabled environment 100, such a topological representation can be constructed indicating relative proximity of each of rooms 101-107 to each other. In one such embodiment, once the location of the user is determined, the room in which the user is located is selected as a primary space, rooms adjacent to the primary space (as indicated by the topological representation) are each selected as secondary spaces, and rooms that are on a different floor or are adjacent to secondary spaces are selected as tertiary spaces. In other embodiments, secondary and tertiary spaces may have different definitions, such as rooms that are located on a different floor than the primary space or in a different building than the primary space. Thus, the priority of each room in smart-device-enabled environment 170 can be determined based on the unique floor plan and relative positioning of rooms within smart-device-enabled environment 170.

In some embodiments, the priority of each of rooms 101-107 is based on a number of smart devices included in each of rooms 101-107. In such embodiments, central controller 170 selects the room or other physical space with the most smart devices, or each room with more than a maximum threshold number of smart devices as a primary space. In such embodiments, central controller 170 selects each room with fewer smart devices than the maximum threshold number of smart devices but more than a minimum threshold number of smart devices as a secondary space, and each room with fewer smart devices than the minimum threshold number of smart devices as a tertiary space. Alternatively, in some embodiments, the priority of each of rooms 101-107 is based on a number of active smart devices included in each of rooms 101-107. Thus, the relative priority of rooms 101-107 can change as feedback information provided to central controller 170 from the various smart devices of smart-device-enabled environment 100 indicate that different smart devices have been activated or deactivated in particular rooms.

In some embodiments, the priority of each of rooms 101-107 is based on a user-defined hierarchy between each of rooms 101-107. In such embodiments, a user explicitly defines one or more of rooms 101-107 as a primary space, some, none, or all of the remainder rooms as secondary spaces, and some, none, or all of the remainder rooms as tertiary spaces. Thus, a user can ensure that a particular one of rooms 101-107 is always defined as, for example, a primary space, regardless of how many smart-device services are active or what the proximity of the particular room is from the user. Alternatively or additionally, the priority of each of rooms 101-107 can be based on a frequency or recency of use by a user and/or a frequency or recency of interaction by the user. Thus, when a user interacts with smart devices within a particular room, such as interrogating or controlling the smart devices, the priority of that room can be increased relative to other rooms that otherwise have the same priority.

Each of device drivers 213 may correspond to a software program configured to operate or control a particular smart device in smart-device-enabled environment 100. Specifically, each device driver 213 is configured to provide a software interface to a specific smart device that enables central controller 170 to communicate with and/or access hardware functions of that specific smart device. Thus, via device drivers 213, central controller 170 can interrogate and control a wide variety of smart devices, even when these smart devices employ different communication and control protocols, such as manufacturer-specific protocols. As a result, a user can interact with each of the various smart devices of smart-device-enabled environment 100 with a single interface or GUI displayed by computing device 200, rather than executing multiple specialized applications. For example, according to various embodiments, by interacting with central controller 170 or with a suitably programmed mobile computing device, a user can interrogate and/or control smart lights 130 that are incorporated into a ZigBee-based mesh network, open or close an automated window blind in a Z-Wave-based home automation system, and remotely start and control a Bluetooth®-enabled audio-video receiver. By contrast, with conventional systems, multiple devices and/or executing applications are typically required for a user to complete such disparate smart-device-based tasks. Thus, central controller 170 provides a robust platform for a plurality of brands and manufacturers of smart devices.

Figure 3:
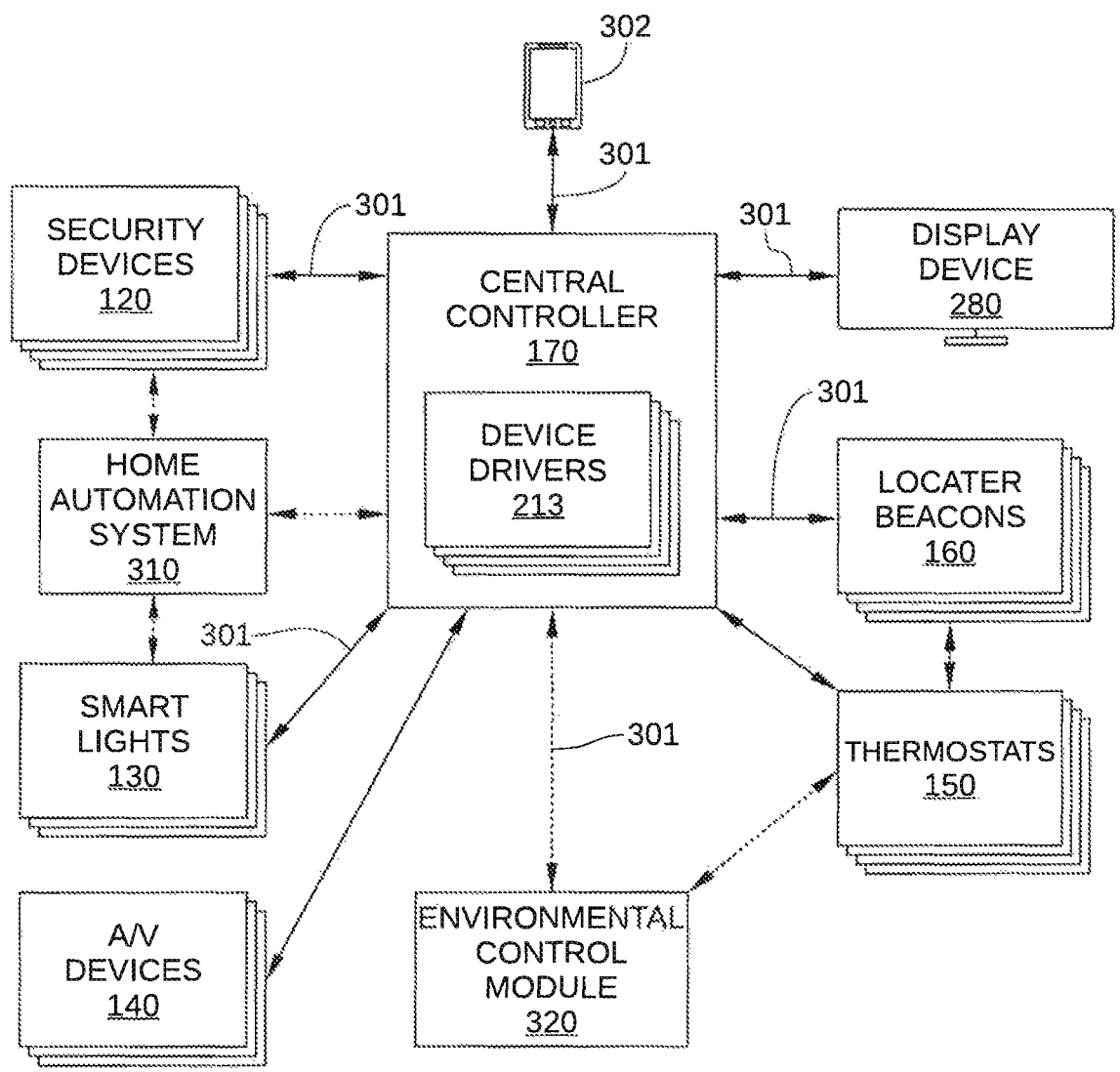
FIG. 3 is a block diagram illustrating communication connections within the smart-device-enabled environment of FIG. 1, according to various embodiments of the present disclosure.

FIG. 3 is a block diagram illustrating communication connections within smart-device-enabled environment 100, according to various embodiments of the present disclosure. As shown, central controller 170 is communicatively connected to security devices 120, smart lights 130, smart A/V devices 140 (e.g., smart speakers 141 and network-controlled video display devices 142), thermostats 150, and locater beacons 160 via network connections 301. As noted above, network connections 301 include wired network connections, wireless network connections, or a combination of each. In addition, central controller 170 transmits GUI outputs to and receives user input from a display device, such as a touch-sensitive panel or any other display device 280. Alternatively or additionally, central controller 170 transmits GUI outputs to and receives user input from a mobile computing device 302, such as a smartphone, electronic tablet, or wearable computing device. In such embodiments, mobile computing 302 executes smart home mobile controller application 212.

Alternatively or additionally, in some embodiments, central controller 170 interacts with one or more of the smart devices of smart-device-enabled environment 100 via an intermediary controller. For example, in one such embodiment, central controller 170 transmits control signals to and receives feedback information and status data from a home automation system 310, rather than to and from security devices 120 and smart lighting 130 directly. Similarly, in another such embodiment, central controller 170 transmits control signals to and receives status data from a smart-device-enabled environmental control module 320, rather than to and from thermostats 150 directly.

Figure 4:
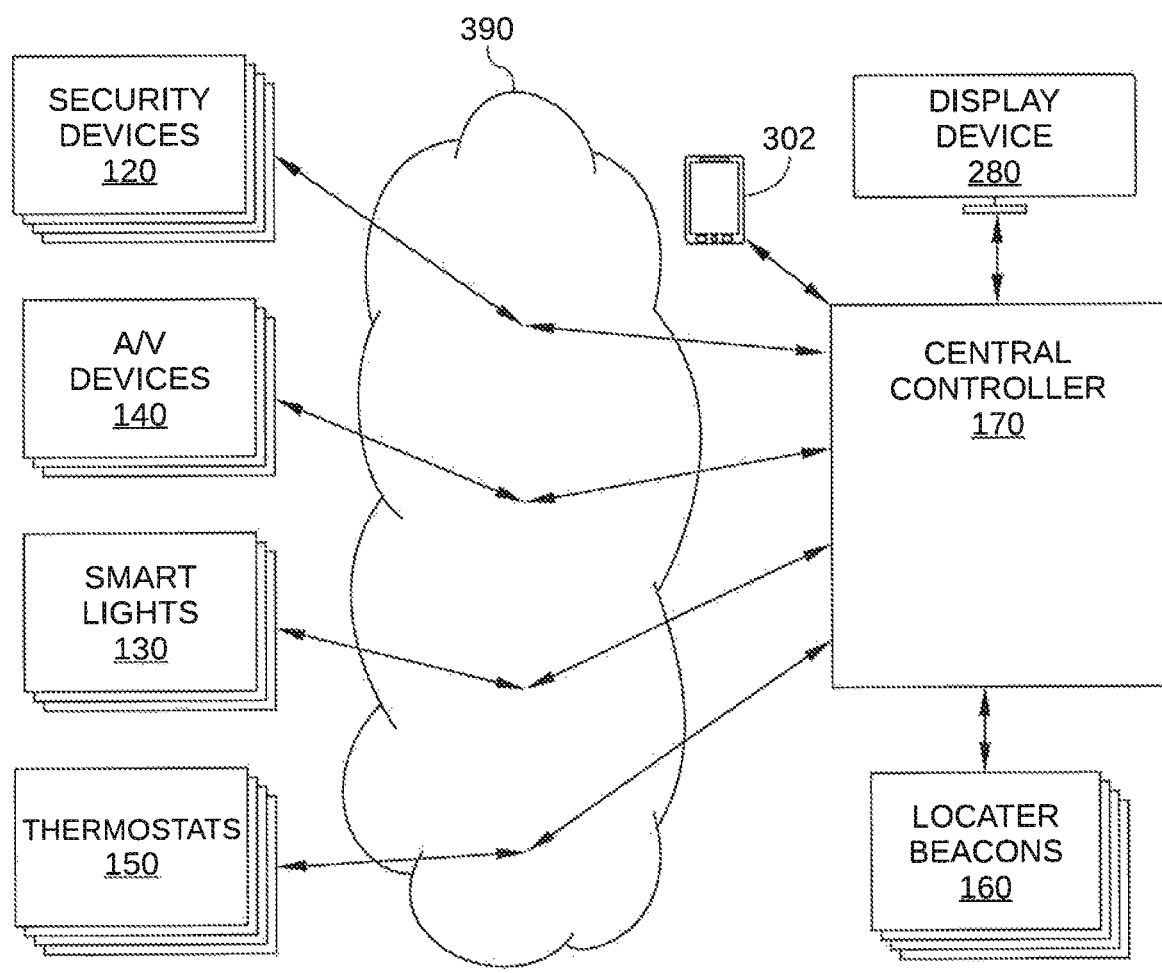
FIG. 4 is a block diagram illustrating communication connections within the smart-device-enabled environment of FIG. 1, according to different embodiments of the present disclosure.

FIG. 4 is a block diagram illustrating communication connections within smart-device-enabled environment 100, according to different embodiments of the present disclosure. Unlike the embodiment illustrated in FIG. 3, in some embodiments, central controller 170 may not be directly connected to one or more of the security devices 120, smart lights 130, smart A/V devices 140, and thermostats 150. Instead, central controller 170 may communicate with the various smart devices of smart-device-enabled environment 100 via a suitable Internet cloud service. Thus, status data, feedback information, and anomaly alerts are communicated from a particular smart device via the Internet 390 to a corresponding cloud service (not shown), and such information is then accessed by central controller 130 via Internet 390. Similarly, control signals for a particular smart device are transmitted to the appropriate cloud service associated with that particular smart device, and are then sent to the smart device via Internet 390. In such embodiments, device drivers 213 are generally not required for central controller 170 to interact with security devices 120, smart lights 130, smart A/V devices 140, or thermostats 150.

In some embodiments, central controller 170 interacts with the smart devices in smart-device-enabled environment 100 by a combination of the techniques set forth in FIGS. 3 and 4. Thus, in such embodiments, a combination of cloud services and device drivers 213 are employed by central controller 170.

Figure 5:
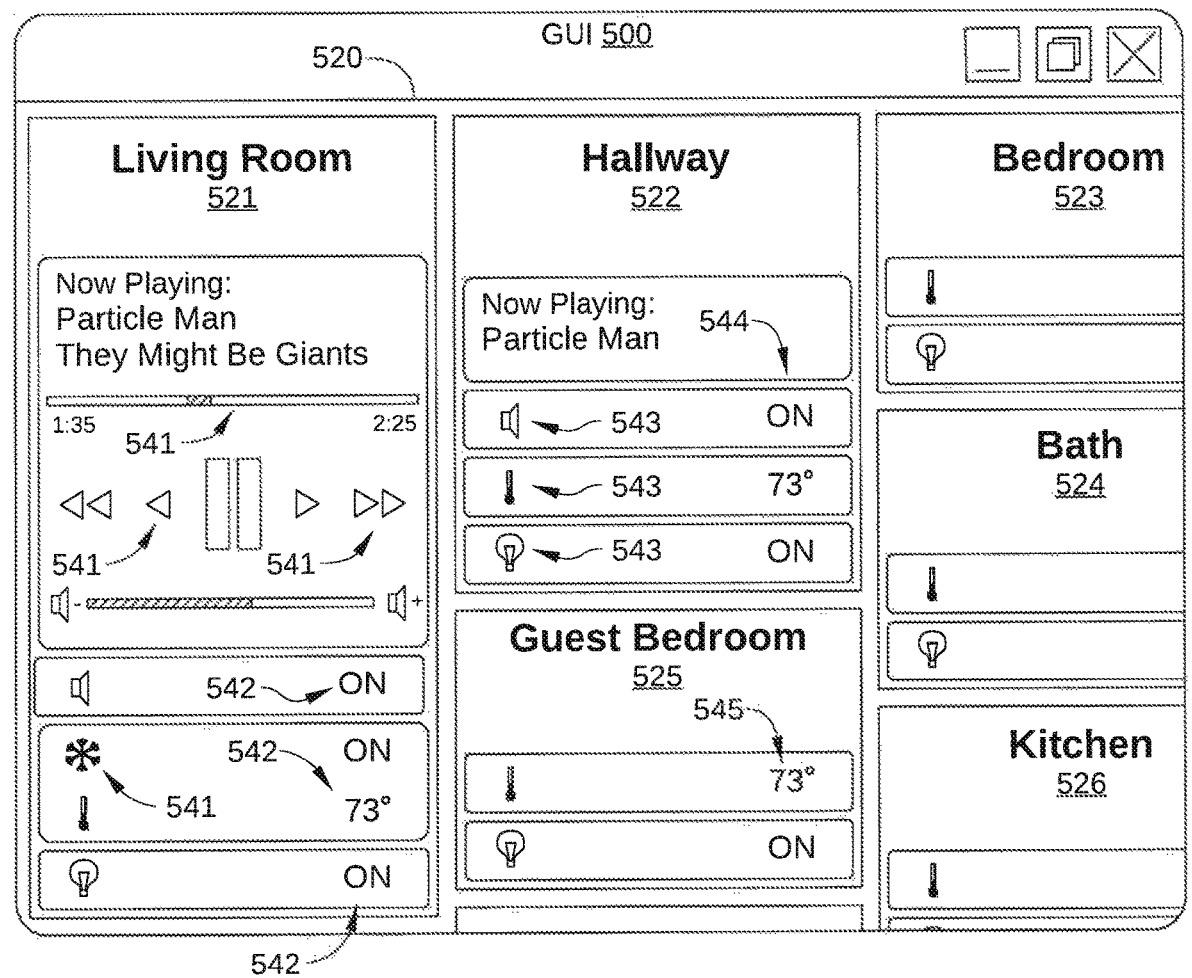
FIG. 5 schematically illustrates a device interaction page of a graphical user interface implemented on a display device, according to various embodiments of the present disclosure.

FIG. 5 schematically illustrates a device interaction page 520 of a GUI 500 implemented on a display device, according to various embodiments of the present disclosure. GUI 500 can be displayed on a display device coupled to or otherwise associated with central controller 170 and/or on a display device associated with a mobile computing device executing smart home mobile controller application 212. As shown, device interaction page 520 of GUI 500 includes multiple visual tiles 521-527 that each correspond to one of rooms 101-107 of smart-device-enabled environment 100. Therefore, device interaction page 520 enables a user to interact with each smart device for which a visual tile is displayed.

Visual tiles 521-527 include a primary visual tile 521, a secondary visual tile 522, and tertiary visual tile 523-526. Primary visual tile 521 corresponds to a room that is selected to be a primary space by central controller 170, secondary visual tile 522 corresponds to a room that is selected to be a secondary space by central controller 170, and each of tertiary visual tiles 523-523 corresponds to a room that is selected to be a tertiary space by central controller 170. As set forth above, central controller selects each of rooms 101-107 to be a primary, secondary, or tertiary space based on a priority of that room, as determined via room prioritization module 219.

In the embodiment illustrated in FIG. 5, a single primary tile 521 and a single secondary tile 522 are displayed in device interaction page 520. In other embodiments, multiple secondary tiles and/or multiple primary tiles may be displayed. For example, and without limitation, one such primary tile corresponds to a room in which a user is located, while another primary tile corresponds to a room that is a user-defined primary space. In the same vein, for example and without limitation, the multiple secondary tiles each correspond to a room adjacent to a room in which the user is located.

Generally, each of primary visual tile 521, secondary visual tile 522, and tertiary visual tiles 523-526 displays information pertinent to the room corresponding to that visual tile, including controls, feedback information, and notifications or alerts for one or more of the smart devices in that room. Examples of such controls include, without limitation, switches to mute/unmute a music player or smart speaker 141, turn on/off smart lights 130, turn on/off all active services in the room, etc. Examples of feedback information provided by primary visual tile 521 include, without limitation, room identification information, occupation information and/or other room status, current temperature, what if any media sources are active, and what media are playing, among others. Generally, such feedback information includes data that are reported from smart devices and services inside the room to central controller 170. Examples of notifications or alerts include, without limitation, smoke detection, intruder alerts, weather alert, device errors or outages, etc. Thus, notifications and alerts generally report a serious anomaly, such as issues that may requiring immediate attention or intervention from the user.

Primary visual tile 521 is displayed with more visual prominence than secondary visual tile 522, which in turn is displayed with more visual prominence than each of tertiary visual tiles 523-526. For example, in some embodiments, primary visual tile 521 is larger than secondary visual tile 522, and secondary visual tile 522 is larger than any of tertiary visual tiles 523-526. Alternatively or additionally, in some embodiments, primary visual tile 521 is displayed in a more visually prominent location within device interaction page 520, such as in a top region of device interaction page 520, and/or in a first order position, such as on a left-hand side of device interaction page 520. In such embodiments, secondary visual tile 522 is displayed in a less visually prominent location than primary visual tile 521, such as in a lower region of device interaction page 520, and/or in a second order position, such as on a right-hand side of device interaction page 520 or off-screen in a region of device interaction page 520 that cannot be viewed without scrolling across or down. Similarly, in such embodiments, tertiary visual tiles 523-526 are each displayed in a less visually prominent location than secondary visual tile 522.

In some embodiments, primary visual tile 521 displays more detailed information that is associated with the smart device or devices included in the primary space than the information displayed by secondary visual tile 522 that is associated with the smart device or devices included in each secondary space. For example, in one such embodiment, primary visual tile 521 includes controls 541, feedback 542, and notifications or alerts (not shown) for most or all of the smart devices included in the room corresponding to primary visual tile 521, i.e., the room selected by central controller 170 as the primary space of smart-device-enabled environment 100. By contrast, in such an embodiment, each of secondary visual tile 522 may include limited controls 543 and feedback 544 for some or one of the smart devices included in the room corresponding to that secondary visual tile, or for the most frequently used smart device or service included in that room. Similarly, in such an embodiment, secondary visual tile 522 displays more information that is associated with the smart device or devices included in each secondary space than the information displayed by tertiary visual tiles 523-526 that is associated with the smart device or devices included in each tertiary space. For example, tertiary visual tiles 523-526 may display limited feedback 545 and, when applicable, notifications and alerts (not shown) for a corresponding room. Thus, less information is provided to a user for lower priority spaces in smart-device enabled environment 100 than the space or spaces having the highest priority for the user.

Because primary visual tile 521 displays more detailed information related to smart-device-enabled services than secondary visual tile 522 a higher level of interaction with smart devices and services is associated with the primary visual tile than the secondary visual tile and tertiary visual tiles. Consequently, a relatively low cognitive load is imposed on a user when browsing through a large number of rooms that can potentially include a very large number of smart devices. Specifically, only urgent or user-selected information is presented for the lower priority rooms. Furthermore, some or all of the lower priority rooms are displayed with low visual prominence, thereby being less distracting to a user who is searching for a specific smart device or service in a particular higher-priority room. As a result, the user can quickly and efficiently locate and interact with the smart device or service of interest.

Figure 6A:
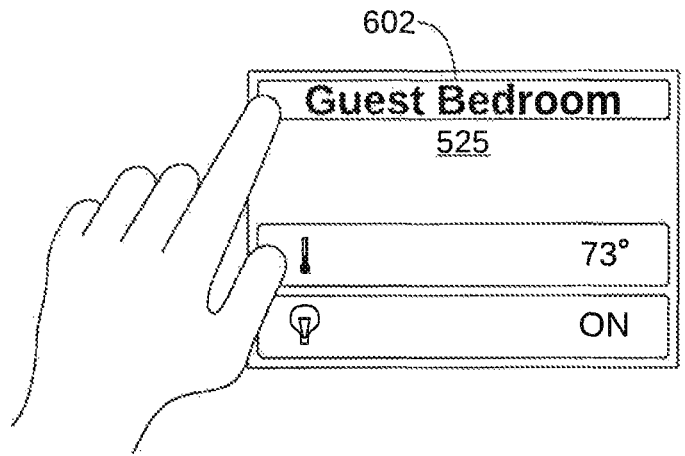
FIG. 6A schematically illustrates a user interacting with a visual tile on the device interaction page of FIG. 5 to generate a separate window dedicated to a corresponding room of the smart-device-enabled environment of FIG. 1, according to various embodiments of the present disclosure.
Figure 6B:
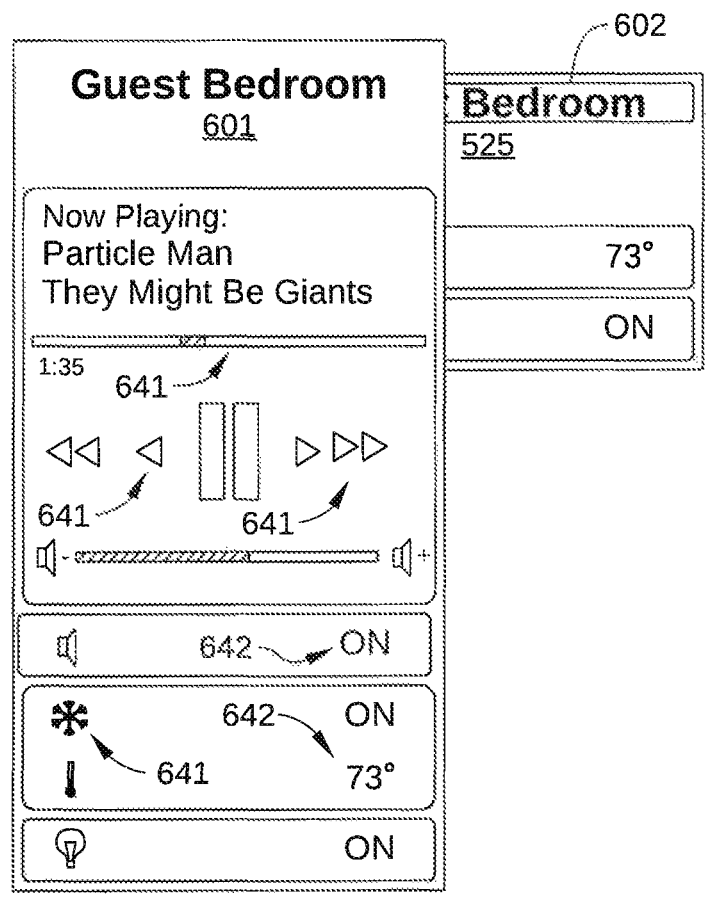
FIG. 6B schematically illustrates the separate window, of FIG. 6A according to various embodiments of the present disclosure.

In some embodiments, each of primary visual tile 521, secondary visual tile 522, and tertiary visual tiles 523-526 is configured to expand when selected by a user to become a primary tile or to open a separate window dedicated to the room corresponding to the selected visual tile. FIGS. 6A and 6B illustrate one such embodiment.

FIG. 6A schematically illustrates a user interacting with tertiary visual tile 525 to generate a separate window 601 dedicated to a corresponding room of smart-device-enabled environment 100, according to various embodiments of the present disclosure. FIG. 6B schematically illustrates separate window 601, according to various embodiments of the present disclosure. When a user selects a suitable interface element in tertiary visual tile 525, such as a room select button 602, separate window 601 is opened in GUI 500. Alternatively, tertiary visual tile 525 may expand out to or be replaced by separate window 601. As shown, separate window 601 includes as much or more information associated with the smart devices included in the room than a primary tile for that room, including controls 641, feedback 642, and/or pertinent notifications and alerts. Thus, by selecting a visual tile representing a lower priority room, a user can expand the level of interaction available for that low priority room with a single gesture, while maintaining a minimal interaction level with other low priority rooms.

Figure 7:
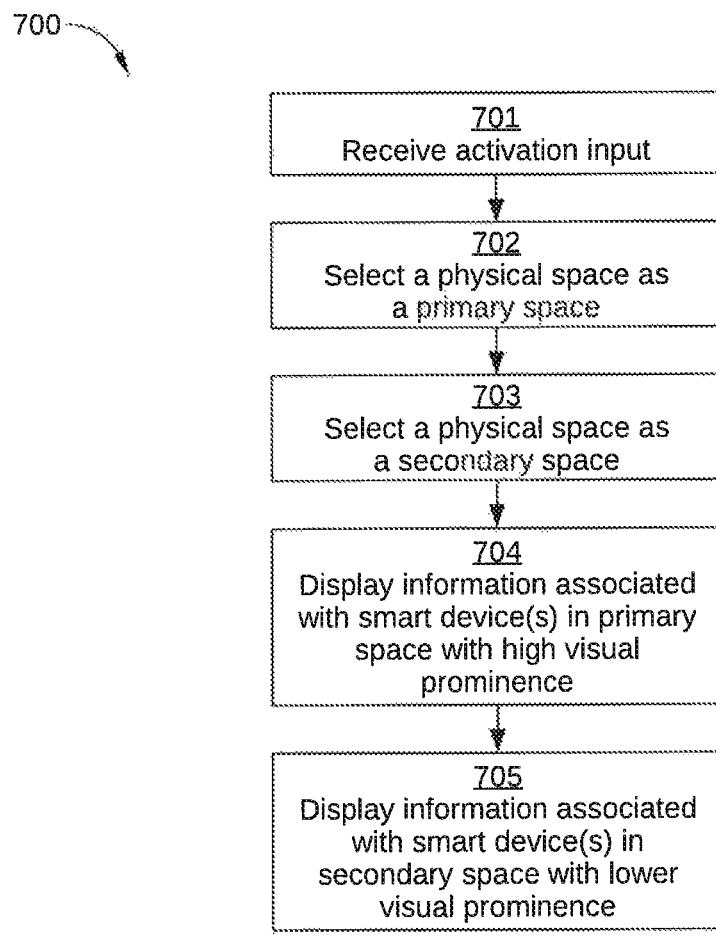
FIG. 7 sets forth a flowchart of method steps for displaying information associated with a smart-device-enabled environment, according to various embodiments of the present disclosure.

FIG. 7 sets forth a flowchart of method steps for displaying information associated with a smart-device-enabled environment, according to various embodiments of the present disclosure. Although the method steps are described with respect to the systems of FIGS. 1-6B, persons skilled in the art will understand that any system configured to perform the method steps, in any order, falls within the scope of the various embodiments.

As shown, a method 700 begins at step 701, in which central controller 170 receives an activation input. In some embodiments, the activation input is a signal indicating detection of a particular user in the environment, such as when a user enters smart-device-enabled environment 100 or moves to a different room within smart-device-enabled environment 100. In such embodiments, the signal may be generated by a mobile or wearable computing device associated with the user and detected by central controller 170, locater beacons 160, and/or security devices 120. In other embodiments, the activation input is received in response to a user input, either to central controller 170 or to a mobile or wearable computing device associated with the user. For example and without limitation, in one such embodiment, a user opens device interaction page 520 of GUI 500, indicating that the user is preparing to interact in some way with one or more of the smart devices included in smart-device-enabled environment 100. In other embodiments, the activation input is received in response to a status change of at least one smart device in the environment. For example and without limitation, when the number of smart devices and/or services in a particular room in the smart-device-enabled environment 100 changes, such as when a device is activated or powered down, the priority of that room relative to other rooms in smart-device-enabled environment 100 may change.

In step 702, in response to receiving the activation input, central controller 170 selects as a primary space a physical space that includes at least one apparatus that is controllable by a networked computing device, e.g., a room that includes a smart device. For example and without limitation, central controller 170 selects one of rooms 101-107 as a primary space in smart-device-enabled environment 100. In some embodiments, central controller 170 selects the primary space based on a priority as determined by prioritization module 219.

In step 703, in response to receiving the activation input, central controller 170 selects as a secondary space a physical space that includes at least one apparatus that is controllable by a networked computing device. For example and without limitation, central controller 170 selects one of rooms 101-107 as a secondary space in smart-device-enabled environment 100. In some embodiments, central controller 170 selects the secondary space based on the priority as determined by prioritization module 219, where the secondary space is determined to have a lower priority than the primary space.

In step 704, central controller 170 causes information associated with the at least one smart device included in the primary space to be displayed with a high visual prominence on a display device. For example and without limitation, such information may be displayed in a visual tile as part of a GUI, where the visual tile is larger than other visual tiles displayed as part of the GUI. Alternatively or additionally, the visual tile may have a visually more prominent position in the GUI than the other visual tiles.

In step 705, central controller 170 causes information associated with the at least one smart device included in the secondary space to be displayed with a lower visual prominence on the display device. For example and without limitation, such information may be displayed in a visual tile as part of a GUI, where the visual tile is smaller than the primary visual tile, but larger than other visual tiles displayed as part of the GUI, such as tertiary visual tiles. Alternatively or additionally, the visual tile may have a visually less prominent position in the GUI than the primary visual tile and a visually more prominent position in the GUI than tertiary visual tiles.

Thus, implementation of method 700 enables a user to navigate efficiently in a user interface to a specific location or smart-device-based service in a smart-device-enabled environment. In addition, the information related to the various locations within the smart-device-enabled environment is selected based on the context of the current user. That is, different information is presented by the user interface to the user based on current smart device status, user location, user preferences, and/or history of user interactions with the smart-device-enabled environment.

In sum, various embodiments set forth systems and techniques for displaying information associated with a smart-device-enabled environment. In response to an activation input, one room or physical space in the smart-device-enabled environment is selected as a primary space and another room or physical space is selected as a secondary space. Information associated with one or more smart devices in the primary space is displayed with a first visual prominence (for example via a primary visual tile) and information associated with one or more smart devices in the secondary space is displayed with a second visual prominence that is less than the first visual prominence (for example via a secondary visual tile). The primary, secondary, and, in some embodiments, tertiary visual tiles are employed to facilitate interactions with specific smart devices and locations within the smart-device-enabled environment, where primary visual tiles are displayed with greater visual prominence than secondary visual tiles, and secondary visual tiles are displayed with greater visual prominence than tertiary visual tiles.

At least one advantage of the disclosed embodiments is that a user can quickly and efficiently locate and interact with a smart device in a smart-device-enabled environment via a user interface when the smart-device-enabled environment includes a large number of rooms or other physical spaces or a large number of smart devices. A further advantage is that the user interface presents contextually relevant information and interface elements based on user preferences, interaction history, and/or location, as well as on currently active services and smart devices.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The claimed invention is:

1. A non-transitory computer-readable storage medium including instructions that, when executed by one or more processors, configure the one or more processors to display information associated with a smart-device-enabled environment by performing the steps of:
   receiving an activation signal;
   in response to receiving the activation signal, selecting as a primary space in the environment a first physical space that includes at least one apparatus that is controllable by a networked computing device;
   selecting as a secondary space in the environment a second physical space that includes at least one apparatus that is controllable by a networked computing device;
   causing control or status information for the at least one apparatus included in the first physical space to be displayed with a first visual prominence on a display device; and
   causing control or status information for the at least one apparatus included in the second physical space to be displayed with a second visual prominence on the display device,
   wherein the first visual prominence is greater than the second visual prominence.

2. The non-transitory computer-readable storage medium of claim 1, wherein causing the control or status information for the at least one apparatus included in the first physical space to be displayed with the first visual prominence comprises displaying the control or status information for the at least one apparatus included in the first physical space within a first visual tile that is larger than a second visual tile within which the control or status information for the at least one apparatus included in the second physical space is displayed on the display device.

3. The non-transitory computer-readable storage medium of claim 2, wherein the first visual tile includes more information than the second visual tile.

4. The non-transitory computer-readable storage medium of claim 1, wherein causing the control or status information for the at least one apparatus included in the first physical space to be displayed with the first visual prominence comprises displaying the control or status information for the at least one apparatus included in the first physical space within a first visual tile that is more prominently positioned on the display device than a second visual tile within which the control or status information for the at least one apparatus included in the second physical space is displayed on the display device.

5. The non-transitory computer-readable storage medium of claim 1, wherein selecting the first physical space as the primary space is based on a priority of the first physical space relative to the second physical space.

6. The non-transitory computer-readable storage medium of claim 5, wherein the priority is based on a first distance between the first physical space and the display device and a second distance between the second physical space and the display device, the first distance being less than the second distance.

7. The non-transitory computer-readable storage medium of claim 5, wherein the priority is based on a first distance between the first physical space and a detected location of a user and a second distance between the second physical space and the detected location of the user, the first distance being less than the second distance.

8. The non-transitory computer-readable storage medium of claim 5, wherein the priority is based on determining that a first number of smart devices included in the first physical space exceeds a second number of smart devices included in the second physical space.

9. The non-transitory computer-readable storage medium of claim 5, wherein the priority is based on a user-defined hierarchy between the first physical space and the second physical space.

10. The non-transitory computer-readable storage medium of claim 1, further comprising instructions that, when executed by one or more processors, configure the one or more processors to perform the steps of:
    selecting, as a tertiary space in the environment, a third physical space that includes at least one apparatus that is controllable by a networked computing device; and
    causing control or status information for the at least one apparatus included in the third physical space to be displayed with a third visual prominence on the display device,
    wherein the second visual prominence is greater than the third visual prominence.

11. The non-transitory computer-readable storage medium of claim 10, wherein causing the control or status information for the at least one apparatus included in the third physical space to be displayed with the third visual prominence comprises displaying the control or status information for the at least one apparatus included in the third physical space within a third visual tile that is less prominently positioned on the display device than a second visual tile within which the control or status information for the at least one apparatus included in the second physical space is displayed on the display device.

12. The non-transitory computer-readable storage medium of claim 11, wherein the third visual tile includes less information than the second visual tile.

13. A method for displaying information associated with a smart-device-enabled environment, the method comprising:
    receiving an activation signal;
    in response to receiving the activation signal, selecting as a primary space in the environment a first physical space that includes at least one apparatus that is controllable by a networked computing device;
    selecting as a secondary space in the environment a second physical space that includes at least one apparatus that is controllable by a networked computing device;
    causing control or status information for the at least one apparatus included in the first physical space to be displayed with a first visual prominence on a display device; and
    causing control or status information for the at least one apparatus included in the second physical space to be displayed with a second visual prominence on the display device,
    wherein the first visual prominence is greater than the second visual prominence.

14. The method of claim 13, further comprising:
    selecting, as a tertiary space in the environment, a third physical space that includes at least one apparatus that is controllable by a networked computing device; and causing control or status information for the at least one apparatus included in the third physical space to be displayed with a third visual prominence on the display device,
wherein the second visual prominence is greater than the third visual prominence.

15. The method of claim 14, wherein causing the control or status information for the at least one apparatus included in the third physical space to be displayed with the third visual prominence comprises displaying the control or status information for the at least one apparatus included in the third physical space within a third visual tile that is less prominently positioned on the display device than a second visual tile within which the control or status information for the at least one apparatus included in the second physical space is displayed on the display device.

16. The method of claim 15, wherein the third visual tile includes less information than the second visual tile.

17. The method of claim 13, wherein selecting as the secondary space in the environment the second physical space is performed in response to receiving the activation signal.

18. A system comprising:
a memory storing a smart home control application; and
one or more processors that are coupled to the memory and, when executing the smart home control application, are configured to:
receive an activation signal;
in response to receiving the activation signal, select as a primary space in an environment a first physical space that includes at least one apparatus that is controllable by a networked computing device;
select as a secondary space in the environment a second physical space that includes at least one apparatus that is controllable by a networked computing device;
cause control or status information for the at least one apparatus included in the first physical space to be displayed with a first visual prominence on a display device; and
cause control or status information for the at least one apparatus included in the second physical space to be displayed with a second visual prominence on the display device,
wherein the first visual prominence is greater than the second visual prominence.

19. The system of claim 18, wherein the activation signal comprises at least one of a signal indicating detection of a particular user in the environment, detection of a location of particular user, a user input, and a signal indicating a status change of an apparatus in the environment that is controllable by a networked computing device.

20. The system of claim 19, wherein the user input is received via a computing device connected to the display device.

* * * * *